No. 716,970. Patented Dec. 30, 1902.
E. H. WERNER.
ROTARY ENGINE.
(Application filed May 26, 1902.)
(No Model.) 2 Sheets—Sheet 1.
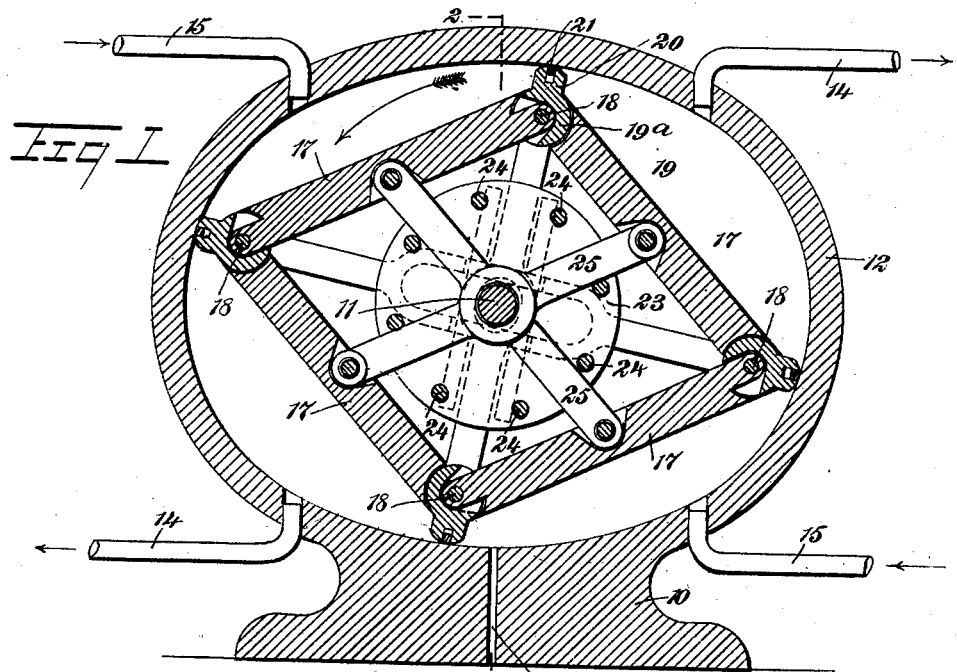
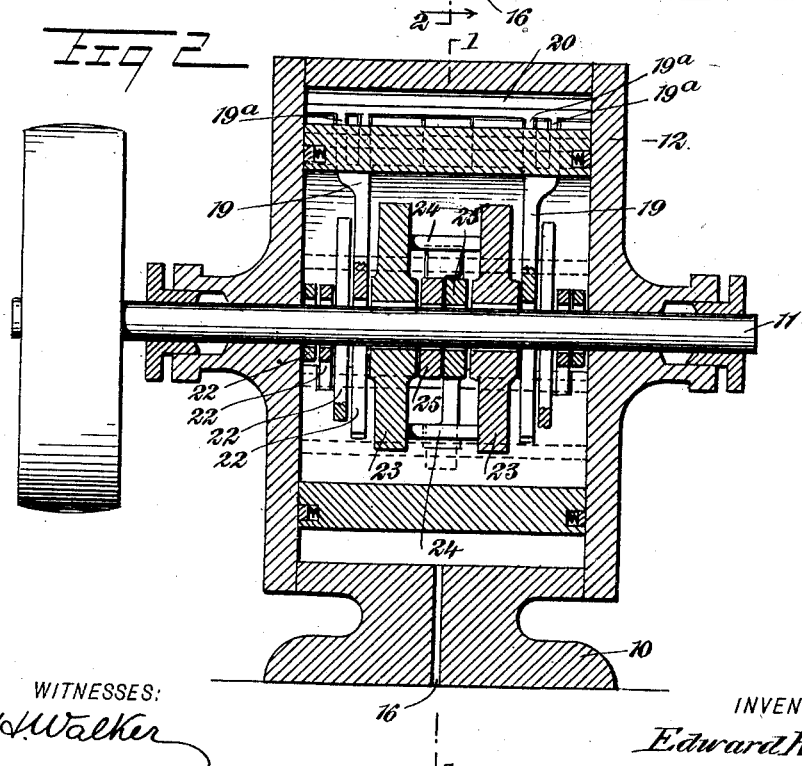
WITNESSES:
INVENTOR
Edward H. Werner
BY
ATTORNEYS.

No. 716,970. Patented Dec. 30, 1902.
E. H. WERNER.
ROTARY ENGINE.
(Application filed May 26, 1902.)
(No Model.) 2 Sheets—Sheet 2.
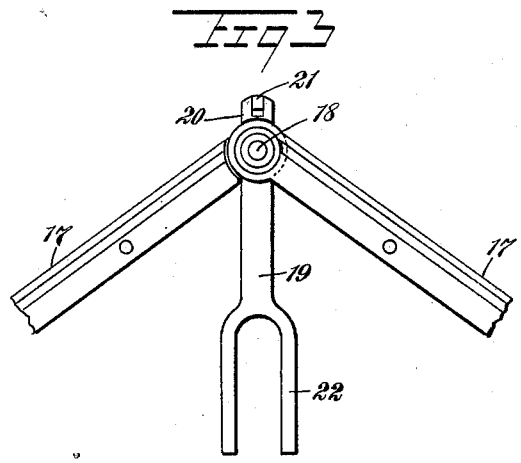
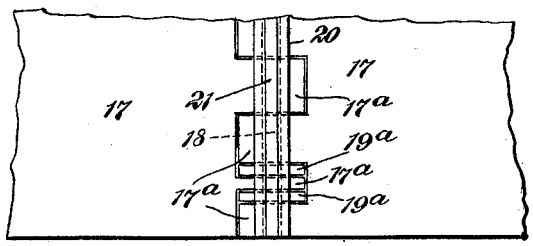
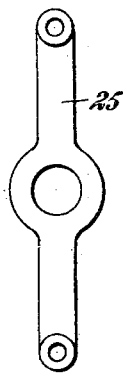
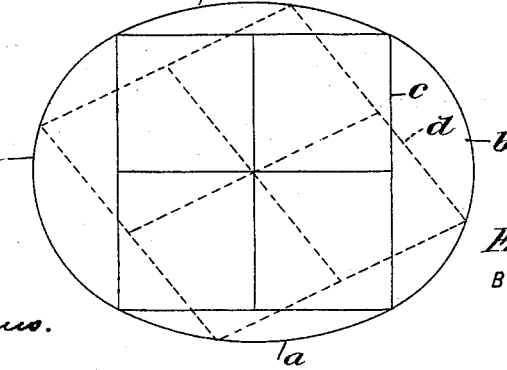
WITNESSES:
H. Walker
Isaac B. Owens.
INVENTOR
Edward H. Werner
BY
ATTORNEYS

UNITED STATES PATENT OFFICE.

EDWARD H. WERNER, OF SOMERSET, PENNSYLVANIA.

ROTARY ENGINE.

SPECIFICATION forming part of Letters Patent No. 716,970, dated December 30, 1902.

Application filed May 26, 1902. Serial No. 108,927. (No model.)

*To all whom it may concern:*

Be it known that I, EDWARD H. WERNER, a citizen of the United States, and a resident of Somerset, in the county of Somerset and State of Pennsylvania, have invented a new and Improved Rotary Engine, of which the following is a full, clear, and exact description.

This invention is useful either as an engine, pump, or compressor, as will be obvious to a person skilled in the art; but in the following specification I shall refer to it simply as an "engine."

Generally stated, the invention involves the combination, with an oval-shaped or elongated piston-chamber or casing, of a piston formed of jointed sections so disposed with respect to the casing that as the piston turns its parts move relatively, so that it is always in contact with the inner walls of the casing at a plurality of points. The motive force acting on this piston causes it to turn continuously, and its movement is thus transmitted to the shaft of the engine.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a sectional view on the line 1 1 of Fig. 2. Fig. 2 is a sectional view on the line 2 2 of Fig. 1. Fig. 3 is a detail view showing the manner of joining the piston-heads to the spokes which connect said heads with the engine-shaft. Fig. 4 is a plan view of said joining. Figs. 5 and 6 are detail views of the rods for joining the piston-heads in pairs, and Fig. 7 is a diagram illustrating an example of the proportions of the casing or piston-chamber with respect to the piston.

10 indicates the base of the engine, and 11 indicates the engine-shaft, which is mounted centrally in the cylinder or casing 12. This casing, as shown in Fig. 1, is of oval interior formation and has steam-pipes 14 and 15 leading thereinto. According to the example here illustrated the pipes 15 are the steam-feed pipes and the pipes 14 the exhaust-pipes.

16 indicates a drain of any suitable sort for carrying off the water of condensation from the casing.

The piston has four rectangular heads 17. These heads 17 are arranged in rectangular relation to each other, as Fig. 1 shows, and are joined pivotally together at their meeting edges by means of pins 18, such connection being effected by the interengaging or teeth-like portions $17^a$ of the piston-heads, as illustrated best in Fig. 4. The pins 18 are always passed loosely through the flat forked ends $19^a$ of the spokes 19. Those forked ends lie in recesses formed in the piston-heads, as illustrated in Fig. 4, and are thus joined to the piston-heads on pivots coincident to the pivotal connection of the piston-heads with each other. There are two spokes 19 for each of the pins 18, and each of these pairs of spokes carries a transverse bar 20, in which is held a packing-strip 21. These bars 20 lie over the meeting edges of the piston-heads, and their strips 21 are adapted to engage with the inner surface of the casing 12, so as to effect the steam-tight connection therewith. The inner ends of the spokes 19 are forked, as indicated at 22, and these forks straddle the shaft 11. By these means the spokes 19 are free to move radially of the shaft, but are held against sidewise movement transversely of the shaft. This radial movement of the spokes allows the piston to change its form so as to suit the form of the cylinder or casing.

Fastened to the shaft 11 are two disks 23, which are connected rigidly together by a series of transverse pins 24, these disks and pins turning with the shaft.

25 indicates the rods which couple the piston-heads together in pairs, these rods being two in number and being located between the disks 23. They have hubs fitted loosely on the shaft 11, and said rods are crossed with respect to each other and pivoted to the inner sides of the piston-heads, each head having the end of one rod joined thereto, as shown, and said rods passing outward from the disks 23, between the pins 24 thereof. These rods 25 not only join the piston-heads together, but they also serve to transmit the movement of the piston to the shaft 11 through the medium of the elements 23 and 24.

In the operation of the engine, assuming the steam or other motive fluid to be admitted through the pipes 15, the steam-pressure will act on the piston-heads 17 immediately opposite these pipes, and the piston will be turned in the direction of the arrow shown in Fig. 1. As the piston moves through the casing its form will be changed so as to cause its four packing-strips 21 to bear continuously against the inner walls of the cylinder, forming steam-tight connections at these points. During the time that the steam is acting on the two piston-heads opposite the feed-pipes the piston-heads opposite the exhaust-pipes 14 will be approaching the exhaust-ports and causing the exit of the exhaust-steam. The movement of the engine may be reversed by reversing the flow of steam, as will be readily understood. In this connection it is pointed out that the reversal of the engine will cause the rods 25 to disengage the four cross-pins 24, with which the said rods are shown engaged in Fig. 1, and these rods will slightly change their relation and engage the remaining four cross-pins 24, thus transmitting the driving force to the shaft 11 in the same manner, but through the medium of different cross-pins than those before explained.

The form of the cylinder or chamber is not material. It may be of any curved or partly-curved form other than that of a true circle. Fig. 7 is a diagram showing an effective form for the cylinder. According to this diagram the cylinder is oval shape or elongated, its inner walls being made up of two oppositely-situated like curves $a$ and two oppositely-situated like curves $b$, the curves $b$ being of less radius than the curves $a$. These curves $a$ and $b$ are so proportioned with respect to the piston that the piston in rotating through the casing will regularly change from and return to its square form, owing to the action of the walls of the casing on the pivoted parts of the piston. In Fig. 7 the full-lined square $c$ indicates the piston in the position which it assumes when its four heads describe a true square, and the dotted lines $d$ indicate the piston as it stretches out to span the elongated dimension of the cylinder or casing. As opposite corners of the piston pass into engagement with the narrowed or contracted width of the casing or cylinder the piston is contracted at this point and is necessarily expanded toward the elongated ends of the casing, and then as the piston lies in the central position (indicated by the full lines $c$ in Fig. 7) the piston is caused to return to its square form. It will therefore be apparent that according to the principle of my invention the precise form of the cylinder or casing is not essential so long as the elongation of the cylinder is maintained, and this elongation may be in any direction desired—that is to say, the length of the cylinder may lie vertically or horizontally, or in any intermediate inclination.

Various changes in the form and details of my invention may be resorted to at will without departing from the spirit of my invention. Hence I consider myself entitled to all forms of the invention as may lie within the intent of my claims.

Having thus described my invention, I claim as new and desire to secure by Letters Patent—

1. The combination of an elongated cylinder or casing, and a piston fitted to turn therein, said piston being formed of a plurality of heads jointed together and adapted by the relative movement of said heads to follow the internal contour of the cylinder or casing.

2. The combination of an elongated cylinder or casing, and a piston mounted to turn therein, said piston being formed of four heads arranged in rectangular relation to each other and jointed at their ends, whereby as said piston turns, the heads move relatively to each other to change the cross-sectional shape of the piston, causing it to follow the internal contour of the cylinder.

3. The combination of an elongated cylinder or casing, a shaft passing therethrough, and a rotary piston mounted by the shaft, said piston being formed of a plurality of heads or sections pivotally jointed together at their adjacent ends, for the purpose specified.

4. The combination of an elongated cylinder or casing, a shaft passing therethrough, a rotary piston mounted by the shaft, said piston being formed of a plurality of heads or sections pivotally jointed together at their adjacent ends, for the purpose specified, and connections extending from the said heads or sections of the pistons to the shaft.

5. The combination of an elongated cylinder or casing, a shaft passing therethrough, a rotary piston mounted by the shaft, said piston being formed of a plurality of heads or sections pivotally jointed together at their adjacent ends, for the purpose specified, and connections extending from the said heads or sections of the pistons to the shaft, said connections comprising spokes extending from the joints inward to and slidably connected with the shaft, and rods mounted loosely on the shaft intermediately the ends of the rods and pivoted to the piston heads or sections at their ends.

6. The combination of an elongated cylinder or casing, a shaft passing therethrough, a piston adapted to turn in the cylinder and formed of four heads in rectangular disposition with respect to each other, said heads being pivotally connected together at their adjacent ends, spokes pivotally connected to the piston coincident with the pivots connecting piston-heads together, said spokes extending inward and being connected to the shaft to slide transversely therefrom, and two rods loosely mounted on the shaft intermediate the ends of the rods, said rods being crossed and pivotally connected to the piston-heads intermediate the ends of the heads.

7. The combination of an elongated cylinder or casing, a shaft passing therethrough, a piston adapted to turn in the cylinder and formed of four heads in rectangular disposition with respect to each other, said heads being pivotally connected together at their adjacent ends, spokes pivotally connected to the piston coincident with the pivots connecting the piston-heads together, said spokes extending inward and being connected to the shaft to slide transversely therefrom, and two rods loosely mounted on the shaft intermediate the ends of the rods, said rods being crossed and pivotally connected to the piston-heads intermediate the ends of the heads, a disk fastened to the shaft, and pins carried transversely by the disk and engaged by the rods, whereby to transmit the movement of the piston to the shaft.

8. A rotary engine, comprising an elongated cylinder or casing, a shaft mounted to turn therein, two disks fastened to the shaft, rods located between the disks, said rods being loosely mounted on the shaft intermediate their ends, pins attached to the disks and extending from one to the other, said rods being projected between the pins, for the purpose specified, piston-heads pivotally connected to the ends of the rods at points intermediate the lengths of the piston-heads, said heads being disposed in rectangular relation and being pivotally connected together at their ends, spokes also connected to said pivots, and packing devices carried by the spokes and lying respectively adjacent to the joints between the piston-heads, said spokes extending inward to and having connection with the shaft, to allow a free radial movement of the spokes.

In testimony whereof I have signed my name to this specification in the presence of two subscribing witnesses.

EDWARD H. WERNER.

Witnesses:
C. W. BRENNEISEN,
W. C. WEAVER.